(12) United States Patent
Graffeo et al.

(10) Patent No.: US 9,877,613 B1
(45) Date of Patent: Jan. 30, 2018

(54) FOOD STORAGE DEVICE FOR CHILDREN

(71) Applicant: NUK USA LLC, Tarrytown, NY (US)

(72) Inventors: Hannah Graffeo, Virginia Beach, VA (US); Behnam Heydari, Guttenberg, NJ (US); Adriana Jimenez, Bogotá (CO); Peiju Shih, Decatur, GA (US); Hayley Somerville, Baden, PA (US); Amanda Olar, Mesa, AZ (US)

(73) Assignee: NUK USA LLC, Tarrytown, NY (US)

( * ) Notice: Subject to any disclaimer, the term of this patent is extended or adjusted under 35 U.S.C. 154(b) by 54 days.

(21) Appl. No.: 15/011,446

(22) Filed: Jan. 29, 2016

Related U.S. Application Data

(60) Provisional application No. 62/163,275, filed on May 18, 2015.

(51) Int. Cl.
*A47J 47/02* (2006.01)
*B65D 25/28* (2006.01)
*B65D 43/02* (2006.01)

(52) U.S. Cl.
CPC .......... *A47J 47/02* (2013.01); *B65D 25/2802* (2013.01); *B65D 43/02* (2013.01); *B65D 2525/283* (2013.01)

(58) Field of Classification Search
CPC A47J 47/02; B65D 2525/283; B65D 25/2802
USPC ............ 220/501, 756, 212, 23.87, 758, 759; 62/457.1
See application file for complete search history.

(56) References Cited

U.S. PATENT DOCUMENTS

| | | | | | |
|---|---|---|---|---|---|
| 2,294,393 | A | * | 9/1942 | Erne | B65D 7/00 220/23.87 |
| 4,648,529 | A | * | 3/1987 | Blakemore | B65D 81/22 210/803 |
| 5,177,981 | A | * | 1/1993 | Haas | A47G 19/2288 62/1 |
| 6,796,430 | B2 | * | 9/2004 | Mercier | B65D 21/02 206/505 |
| 2004/0211778 | A1 | * | 10/2004 | Lien | B65D 75/5877 220/212.5 |
| 2013/0306667 | A1 | * | 11/2013 | Chan | A47G 19/30 220/810 |

* cited by examiner

*Primary Examiner* — Stephen Castellano
(74) *Attorney, Agent, or Firm* — Eversheds Sutherland (US) LLP

(57) ABSTRACT

A food storage device for children is provided that is able to rinse and clean healthy snacks that may be placed within the food storage device. An inner shell having a number of draining holes allows a parent or caregiver to rinse fruits or vegetables prior to placing the inner shell within an outer shell and secure an access lid having a handle over the inner shell and outer shell. A toddler may be able to reach through the access lid, but the access lid may also prevent contents within the inner shell from falling out of a storage device. An outer lid may also be provided to help prevent spills and leaks from the food storage device.

5 Claims, 2 Drawing Sheets

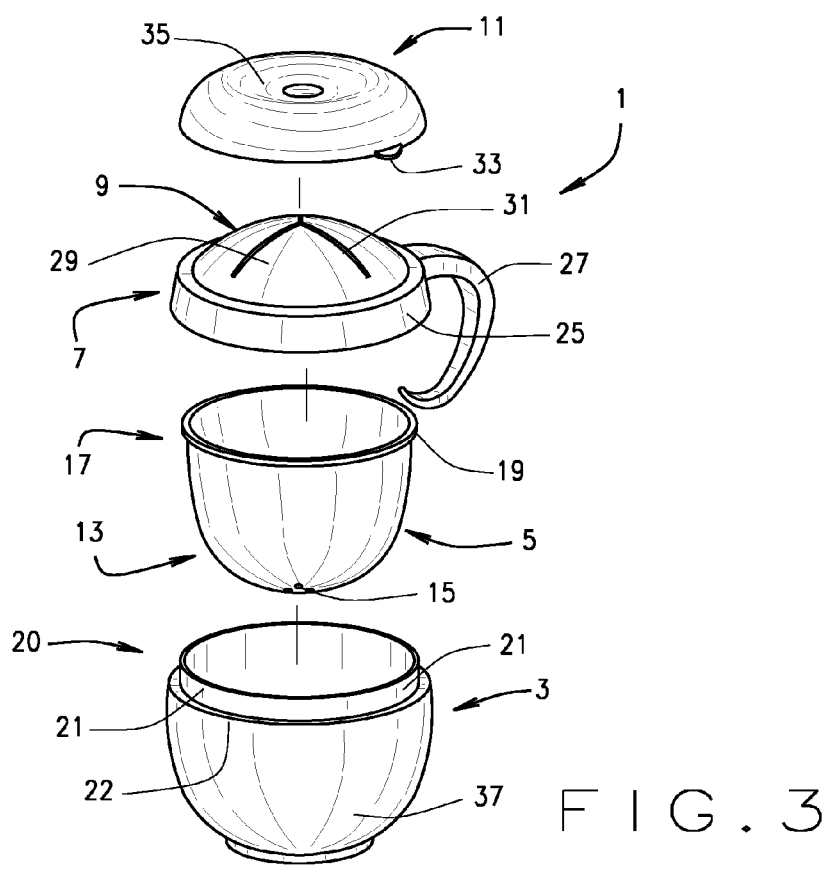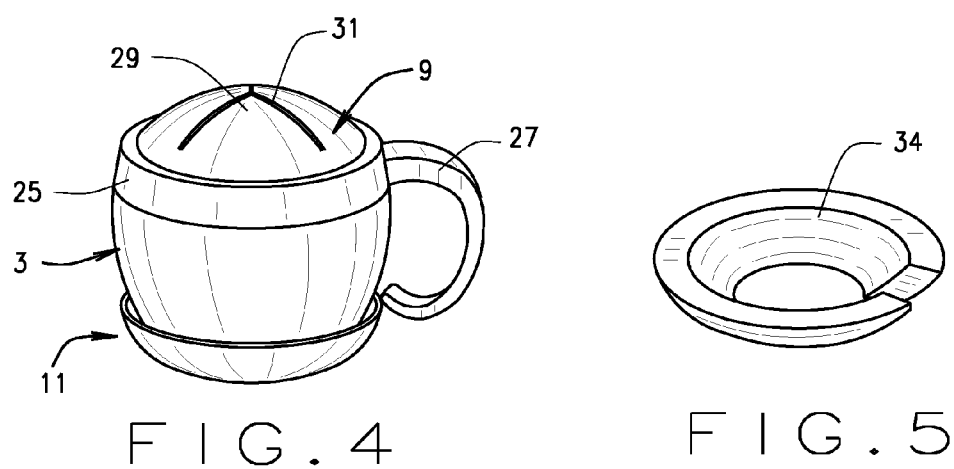

FOOD STORAGE DEVICE FOR CHILDREN

CROSS-REFERENCE TO RELATED APPLICATIONS

This application claims the benefit of U.S. Provisional Application No. 62/163,275, filed May 18, 2015, which is hereby incorporated by reference in its entirety.

FIELD OF INVENTION

The present invention relates generally to a food storage device for children, and more particularly, to a child's food storage device that includes components that allow for easily washing and/or rinsing of fresh fruits or vegetables such that they can be subsequently stored and kept fresh in the food storage device.

BACKGROUND OF INVENTION

Parents strive to balance their work and home lives in a world that is not always conducive to raising a family. The ability of these caregivers to provide their children with the best possible care is critical, regardless of the limited time and resources available to parents. Providing healthy eating options while on the go is difficult. In particular, the preparing, storing, and delivery of fruits and vegetables is significantly more difficult than dry goods such as crackers or cereal.

Parents often pack graspable fruits and vegetables such as carrots, green beans, strawberries, blueberries, and banana slices for consumption during snacking times in an effort to encourage healthy snacking. Often times, this is done simply by placing fruits and vegetables in a resealable bag after washing. This can cause excess moisture to accumulate in the bag, and in the case of certain fruits or vegetables, may make the fruit or vegetable soggy. Moreover, placing the fruits and vegetables in a resealable bag means that the parents must feed the children because of the known dangers, such as suffocation, associated with children when using plastic bags. Forcing parents to retrieve and feed snacks to their children also does not allow the children to gain a sense of independence or an opportunity to develop good hand-eye coordination and self-feeding skills.

Many snacking devices are on the market for use by a toddler. However, those snacking devices are either for use primarily with dry goods, or are not conducive for fresh fruits and vegetables. Similarly, products on the market do not allow a child to gain independence, or create messes that result from a snacking device being shaken or tipped over.

SUMMARY OF THE INVENTION

The invention hereof relates to a food storage device for children. The device preferably allows parents or caretakers to rinse fruits or vegetables prior to securing them in the storage device. Subsequently, children can access the storage device to snack without making a mess.

The food storage device preferably includes an outer shell, and an inner shell that may be called a strainer. The inner shell may be selectively engageable within the outer shell. The inner shell may include several holes that drain liquid from the inner shell, such as after a parent has washed fruits, vegetables, or other snacks and placed them in the inner shell. The fruits and vegetables may be washed directly in the inner shell, with most of the runoff passing through the holes prior to inserting the inner shell within the outer shell. Remaining water may continue to drip out of the inner shell and into the outer shell, thereby containing the remaining water but keeping it separate from the food in the inner shell.

The food storage device also preferably includes an access lid that is selectively engageable with the outer shell and the inner shell. The access lid may allow a child to access the contents of the inner shell when ready to snack.

In one embodiment, the access lid includes several flaps through which a child can reach his or her fingers to access the snacks in the inner shell. The flaps are preferably elastic and return to form after a child removes his or her hand fingers from the access lid so as to reduce the likelihood of leaks and spills.

In another embodiment, the access lid is attached to a handle member. In that implementation, the handle member is directly, selectively engageable with the outer shell and inner shell. The handle member is preferably a ring-like structure that circumscribes the outer and inner shells. The handle member may include an inner wall member and an outer wall member, thus forming a gap therebetween.

The inner shell may also include an outer rim at an upper portion, and the outer shell may include a circumferential wall at an upper portion. In the embodiment including the handle member, the gap between the inner wall member and outer wall member preferably selectively engages the outer rim and the circumferential wall via a friction fit, though other means of attachment are envisioned.

The food storage device may also include an outer lid that is selectively engageable with the access lid to further help prevent spills and leaks. The outer lid also may have a size and structure that allows it to be turned upside down and placed below the outer shell. The outer lid may receive and engage the lower portion of the outer shell such that the outer lid is less likely to be misplaced when the food storage device is in use.

In another embodiment, the food storage device includes a freezable ring that may be releasably positioned between the outer shell and the inner shell or within the outer lid, or anywhere else within the food storage device as would be understood. The freezable ring preferably keeps the snacks within the inner shell at an appropriate temperature when temperature control is desired and/or necessary.

DESCRIPTION OF THE DRAWINGS

For a better understanding of the various embodiments of the present invention, reference may be made to the accompanying drawings in which:

FIG. 3 is an exploded view of the food storage device illustrated in FIGS. 1 and 2;

FIG. 4 is a perspective view of the food storage device of FIGS. 1-3, wherein an outer lid of the food storage device has been selectively engaged with an outer shell of the food storage device;

FIG. 5 is a perspective view of a freezable ring that can be used with the food storage device to provide temperature regulation.

DETAILED DESCRIPTION OF THE INVENTION

Figure 1:
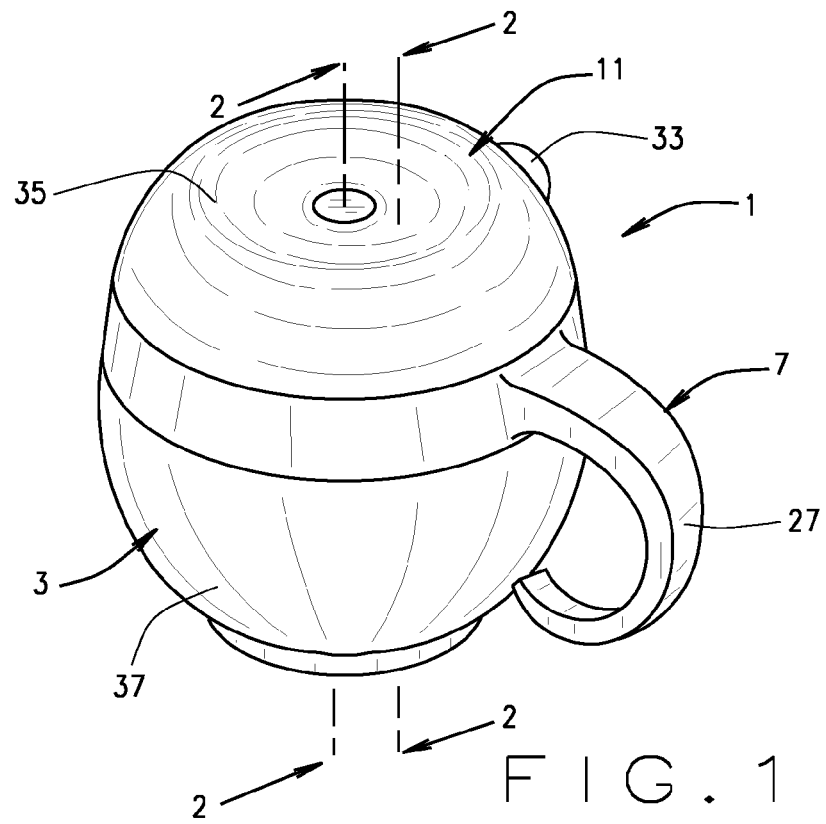
FIG. 1 is a perspective view of an embodiment of a food storage device for children constructed according to the teachings of the present invention.
Figure 2:
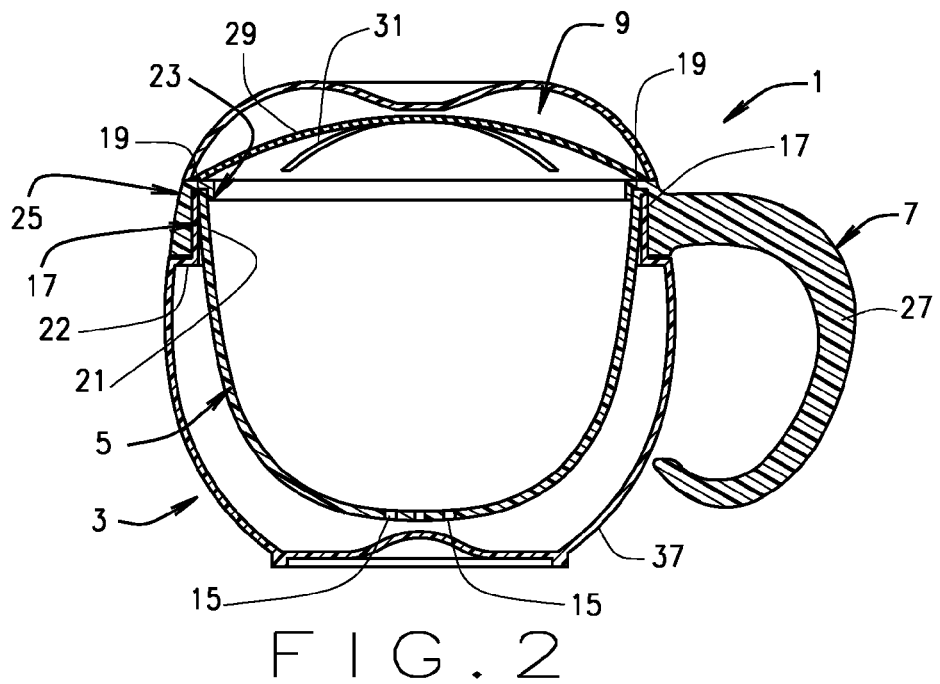
FIG. 2 is a slice view of the food storage device for children illustrated in FIG. 1.

FIG. 1 illustrates a food storage device 1 for children constructed according to the teachings of the present invention. FIGS. 2 and 3 provide a slice view and an exploded view, respectively, of the same. As shown FIGS. 1-3, food storage device 1 may generally include four components. An outer shell 3 preferably is associated with a strainer or inner shell 5 that maybe nested within outer shell 3. A handle member 7 may be associated with an access lid 9 that is integrated within handle member 7, and the handle member 7 may be selectively attachable with outer shell 3. In an embodiment, access lid 9 may be directly engageable with outer shell 3 and inner shell 5. An outer lid 11 may further be selectively attachable with handle member 7 (or access lid 9) in the embodiment illustrated in FIGS. 1-3. Food storage device 1 illustrates a particular size and shape for the food storage device, though in alternative embodiments the various components could take on a nearly limitless variety of shapes and sizes.

To use food storage device 1, a parent or other caretaker may first fill inner shell 5 with a fruit, vegetable, or other snack that he or she will provide for his or her child for consumption. After filling inner shell 5 with a snack such as a fruit or vegetable, the caretaker may rinse the food in the inner shell 5 with water or another cleanser to clean the food within inner shell 5. A bottom portion 13 of inner shell 5 preferably includes one or more draining holes 15 which drain the water or other cleanser from inner shell 5, preferably prior to inserting inner shell 5 into outer shell 3. Preferably, bottom portion 13 is rounded, or otherwise not flat, so that liquid is funneled downwardly out of inner shell 5. In the illustrated embodiments, inner shell 5 includes three round draining holes 15, though in alternative embodiments, there may be more or fewer draining holes, and the draining holes may have a different shape. A gap preferably exists between the bottom portion 13 of inner shell 5 and outer shell 3, to allow any excess water to continue to drip through the draining holes 15 and away from any food contained therein when the food storage device 1 is assembled.

Outer shell 3 is preferably made of polypropylene, as is inner shell 5. Outer shell 3 and inner shell 5 may be manufactured by way of injection molding, or blow molding, though in alternative embodiments they could be 3-D printed or otherwise manufactured using foreseeable manufacturing methods. Outer shell 3 and inner shell 5 may be made up of a different material that is safely freezable, dishwashable, and/or microwaveable.

An upper portion 17 of inner shell 5 preferably includes an outer rim 19 that circumscribes inner shell 5 and is lipped outwardly. Outer rim 19 being lipped outwardly may allow inner shell 5 to rest on an upper portion 20 of outer shell 3 when inner shell 5 is placed within outer shell 3. Preferably, inner shell 5 and outer shell 3 form a water tight sealed connection where outer rim 19 and upper portion 20 abut. Upper portion 20 of outer shell 3 may have an inwardly extending ledge 22 and a circumferential wall 21 extending upwardly from the ledge 22, such that that the circumferential wall 21 has a diameter smaller than the diameter of the outer shell 3 immediately below the ledge 22. Draining holes 15 of inner shell 5 are thereby preferably prevented from touching the bottom of outer shell 3, which would block draining holes 15. Other foreseeable structures for nesting inner shell 5 within outer shell 3 are considered herein. Inner shell 5 being nestled within outer shell 3 in the above described manner may have an additional beneficial effect of food storage device 1 being double-walled and therefore having improved insulating capabilities.

After inner shell 5 is placed within outer shell 3 in the manner described above, handle member 7 may be selectively attachable to outer shell 3. Handle member 7 may include an inner wall member 23 and an outer wall member 25. A gap between inner wall member 23 and outer wall member 25 (not numbered) may selectively receive and engage circumferential wall 21 of outer shell 3 and outer rim 19 of inner shell 5. This engagement may be a friction fit that is sufficiently strong to prevent a toddler from disengaging handle member 7 from outer shell 3. Preferably, the outer wall member 25 is positioned on top of ledge 22. In alternative embodiments, handle member 7 may be releasably engageable with outer shell 3 with mechanisms such as a clip attachment, a snap engagement, a threaded engagement, or other foreseeable mechanisms.

Handle member 7, like outer shell and inner shell 3, may be manufactured using a variety of materials, including polypropylene or silicone. In a preferred embodiment, handle member 7 is constructed of a material that is able to form a sufficient seal with outer shell 5 and inner shell 3 to reduce the likelihood of leaking.

Handle member 7 further preferably includes a handle portion 27 which is grippable by a child or caregiver, and which may be further selectively attachable with a caregiver's diaper bag or other storage mechanism. That way, a caregiver can selectively attach food storage device 1 to a bag when in transit via handle portion 27.

As mentioned above, handle member 7 further may include an access lid 9 associated therewith. Access lid 9 maybe made of a variety of materials, such as soft semi-transparent silicon or the like. It may be shaped as a semi hemisphere or some, and may include a plurality of jaws or flaps 29, with each flap 29 separated from an adjacent flap 29 by a slit 31. Domed flaps 29 preferably provide structure for access lid 9 such that flaps 29 and access lid 9 retain their shape when not being accessed and fit together strongly enough to retain snacks in inner shell 5. Flaps 29 may also retain any drained liquid in inner shell 3. Flaps 29 also are preferably sufficiently flexible to allow children easy access to the contents of food storage device 1.

Slits 31 are sufficiently thin and narrow that snacks contained within inner shell 5 do not fall out of inner shell 5 and access lid 9 where they can cause a mess. Flaps 29 are preferably designed so that when a child reaches his or her hand into inner shell 5, he or she may pull a snack from inner shell 5 out of access lid 9 via flaps 29 and slits 31, and flaps 29 and slits 31 return to the position as shown in FIGS. 1-3 to prevent other snacks from falling out after the child removes his or her hand.

In the illustrated embodiment, access lid 9 is attached to handle member 7, for example by heat sealing, although in alternative embodiments they may be one integral component. In another embodiment, the access lid may be directly attachable to outer shell 3 and/or inner shell 5, and the handle may be integral with the outer shell 3, or left out of the device entirely. In alternative embodiments, the access lid could include more or fewer flaps, though the illustrated embodiment includes three flaps 29.

Outer lid 11 is further selectively engageable with handle member 7 and access lid 9. In the illustrated embodiment, outer lid 11 is selectively engageable with handle member 7 and access lid 9 by a pinching friction fit formed between outer lid 11 and access lid 9, as shown in FIG. 2. In alternative embodiments, outer lid 11 and handle member 7 and/or access lid 9 may be selectively attached by a clip, magnet, or other foreseeable attachment mechanism. Outer lid 11 also preferably includes a tab member 33 which allows a caregiver or a child to easily remove outer lid 11 from handle member 7 and thus access lid 9, inner shell 5, and any snacks contained therein.

FIGS. 1 and 3 further illustrate outer lid 11 having a domed portion 35. As shown, domed portion 35 is preferably curved downwardly when it is in the upright position illustrated in FIGS. 1 and 3. Also seen in FIG. 3, outer shell 3 includes an upwardly rounded base 37. As shown in FIG. 3, rounded base 37 is preferably oriented upwardly when outer shell 3 is in its upright position. FIG. 4 illustrates outer lid 11 having been removed and placed under outer shell 3 such that domed portion 35 has been inverted and it too is curved upwardly. In this embodiment, rounded base 37 of outer shell 3 may receive and frictionally engage domed portion 35 therewithin. In this embodiment, when a parent or caregiver provides food storage device 1 to a child, outer lid 11 may snap onto outer shell 3 such that it is out of the way and will not be lost when used by a child.

FIG. 5 illustrates an additional component that may be used in some alternative embodiments of food storage device 1—freezable ring 39. Freezable ring 39 is sized and shaped such that is may fit either in outer lid 11 or between inner shell 5 and outer shell 3. Freezable ring 39 may be freezable such that a parent can place it in the freezer prior to positioning it either in outer lid 11 or between inner shell 5 and outer shell 3 so as to provide temperature regulation to further keep healthy snacks such as fruits and vegetables fresh when in transit. Freezable ring 39 may be made in a variety of shapes and sizes, including in a shape intended to fit within a car cup holder so that food storage device 1 may be placed within the cup holder and maintained at a cooler temperature. Alternatively, freezable ring 39 may also be heatable, to keep foods stored in the inner shell 5 warm. The freezable ring 39 may alternatively be sized and shaped to fit between the outer shell 3 and the inner shell 5 at any desirable location.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

Thus, there has been shown and described several embodiments of a novel food storage device for children. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". In addition, use of the terms "coupled to" or "coupled with" in the foregoing specification and subsequent claims is intended to mean that other members, components and/or mechanisms may lie between the two members that are "coupled together", and direct attachments, connection or mating of the two members is not required. The same definition is likewise true when using the term "in fluid connection with" in the foregoing specification and subsequent claims. Two members, components or mechanisms "in fluid communication with" each other does require direct connection, attachment or mating between such members but does mean that other members, components and/or mechanisms may lie between such members.

Many changes, modifications, variations and other uses and applications of the present constructions will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A food storage device for children, the food storage device comprising:
    an outer shell comprising a circumferential wall at an upper portion of the outer shell;
    an inner shell comprising:
        an upper portion comprising an outer rim along a top edge of the upper portion; and
        a bottom portion comprising a plurality of draining holes, the inner shell being selectively positionable within and engageable within the outer shell; and
    a handle member comprising:
        an access lid selectively engageable with the outer shell and the inner shell, the access lid comprising:
            an inner annular wall member and an outer annular wall member forming an annular gap therebetween; and
            a plurality of flaps for accessing contents within the inner shell when the access lid is selectively engaged with said inner shell and said outer shell,
        wherein the annular gap between the inner annular wall member and outer annular wall member selectively receives therein and engages the outer rim of the inner shell and the circumferential wall of the outer shell via a friction fit.

2. The food storage device of claim 1, further comprising an outer lid that is selectively engageable with the access lid.

3. The food storage device of claim 2, wherein the access lid is selectively engageable with a lower portion of the outer shell.

4. The food storage device of claim 1, further comprising a freezable ring releasably secured between the outer shell and the inner shell.

5. The food storage device of claim 2, further comprising a freezable ring selectively engageable within the outer lid.

* * * * *